United States Patent
Lankage et al.

(10) Patent No.: US 12,386,887 B2
(45) Date of Patent: Aug. 12, 2025

(54) AUDIO RECOMMENDATION SYSTEM THAT PRESENTS PLAYLIST OF RECEIVED AUDIO TRACKS UNDER RECENTS TAB

(71) Applicants: Ranidu Lankage, Belmont, CA (US); Christie Heikkinen, Santa Monica, CA (US); Andrew Grosvenor Cooper, San Francisco, CA (US)

(72) Inventors: Ranidu Lankage, Belmont, CA (US); Christie Heikkinen, Santa Monica, CA (US); Andrew Grosvenor Cooper, San Francisco, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/228,019

(22) Filed: Apr. 12, 2021

(65) Prior Publication Data

US 2022/0327159 A1    Oct. 13, 2022

(51) Int. Cl.
| | | |
|---|---|---|
| *G06F 16/00* | (2019.01) | |
| *G06F 7/00* | (2006.01) | |
| *G06F 16/61* | (2019.01) | |
| *G06F 16/635* | (2019.01) | |
| *G06F 16/638* | (2019.01) | |
| *G06F 16/64* | (2019.01) | |
| *G06F 16/68* | (2019.01) | |

(52) U.S. Cl.
CPC ............ *G06F 16/639* (2019.01); *G06F 16/61* (2019.01); *G06F 16/635* (2019.01); *G06F 16/64* (2019.01); *G06F 16/686* (2019.01)

(58) Field of Classification Search
CPC ........ G06F 16/639; G06F 16/64; G06F 16/61; G06F 16/635; G06F 16/686; G06F 3/0482; G06F 3/165

USPC .......................................................... 707/725
See application file for complete search history.

(56) References Cited

U.S. PATENT DOCUMENTS

| | | | |
|---|---|---|---|
| 2012/0050185 A1* | 3/2012 | Davydov | G06F 3/04883 345/173 |
| 2014/0052770 A1* | 2/2014 | Gran | H04N 21/8586 709/203 |
| 2015/0006541 A1* | 1/2015 | Hampiholi | G06F 16/4387 707/741 |
| 2016/0063011 A1* | 3/2016 | Wehbi | H04W 4/021 707/711 |
| 2016/0080292 A1* | 3/2016 | Szeto | H04L 51/10 715/752 |

(Continued)

*Primary Examiner* — Raquel Perez-Arroyo
(74) *Attorney, Agent, or Firm* — CM Law; Stephen J. Weed

(57) ABSTRACT

An audio recommendation system adds a "recents" tab in a memory accessible to a messaging system including any audio tracks (songs or sounds) encountered by applications in order to allow quick access to any recently played songs or sounds provided in a message to/from another user or encountered during activities of the user. The displayed "recents" tab enables the user to revisit songs or sounds that the user may wish to use later in another message or to include in the user's music playlist. The "recents" tab also enables the user to browse an audio history in received messages without needing to explicitly save the music or sounds upon receipt. The system determines the source of the encountered sound or song and stores the source of the sound or song in a playlist associated with the recents tab with identifying information for the sound or song.

16 Claims, 8 Drawing Sheets

(56) References Cited

U.S. PATENT DOCUMENTS

| | | | |
|---|---|---|---|
| 2017/0024399 A1* | 1/2017 | Boyle | H04W 4/02 |
| 2018/0182003 A1* | 6/2018 | Maenpaa | G06Q 20/047 |
| 2019/0042647 A1* | 2/2019 | Oh | G06F 16/636 |
| 2019/0272286 A1* | 9/2019 | Casillas | G06F 16/68 |
| 2020/0225837 A1* | 7/2020 | Francioso | H04L 65/612 |

* cited by examiner

AUDIO RECOMMENDATION SYSTEM THAT PRESENTS PLAYLIST OF RECEIVED AUDIO TRACKS UNDER RECENTS TAB

TECHNICAL FIELD

The present subject matter relates to an audio recommendation system, and, more particularly, to an audio recommendation system that allows users to browse an audio history in a messaging application to identify songs or sounds for inclusion in a playlist.

BACKGROUND

Messaging services enable users to listen to featured music and to generate sounds for inclusion in messages. Upon receipt of the messages in messaging services such as SNAPCHAT®, the received music or sounds are typically played once and then discarded. Music identification services (e.g., SHAZAM!® or other music recognition service) can identify music that is playing if the music is captured and the captured music is provided to the music identification service.

BRIEF DESCRIPTION OF THE DRAWINGS

The drawings depict implementations, by way of example only, not by way of limitations. In the figures, like reference numerals refer to the same or similar elements. When a plurality of similar elements is present, a single reference numeral may be assigned to the plurality of similar elements with a letter designation referring to specific elements. When referring to the elements collectively or to a non-specific one or more of the elements, the small letter designation may be dropped.

Features of the various examples described will be readily understood from the following detailed description, in which reference is made to the figures. The various elements shown in the figures are not drawn to scale unless otherwise indicated. The dimensions of the various elements may be enlarged or reduced in the interest of clarity. Included in the drawing are the following figures.

DETAILED DESCRIPTION

Figure 1:
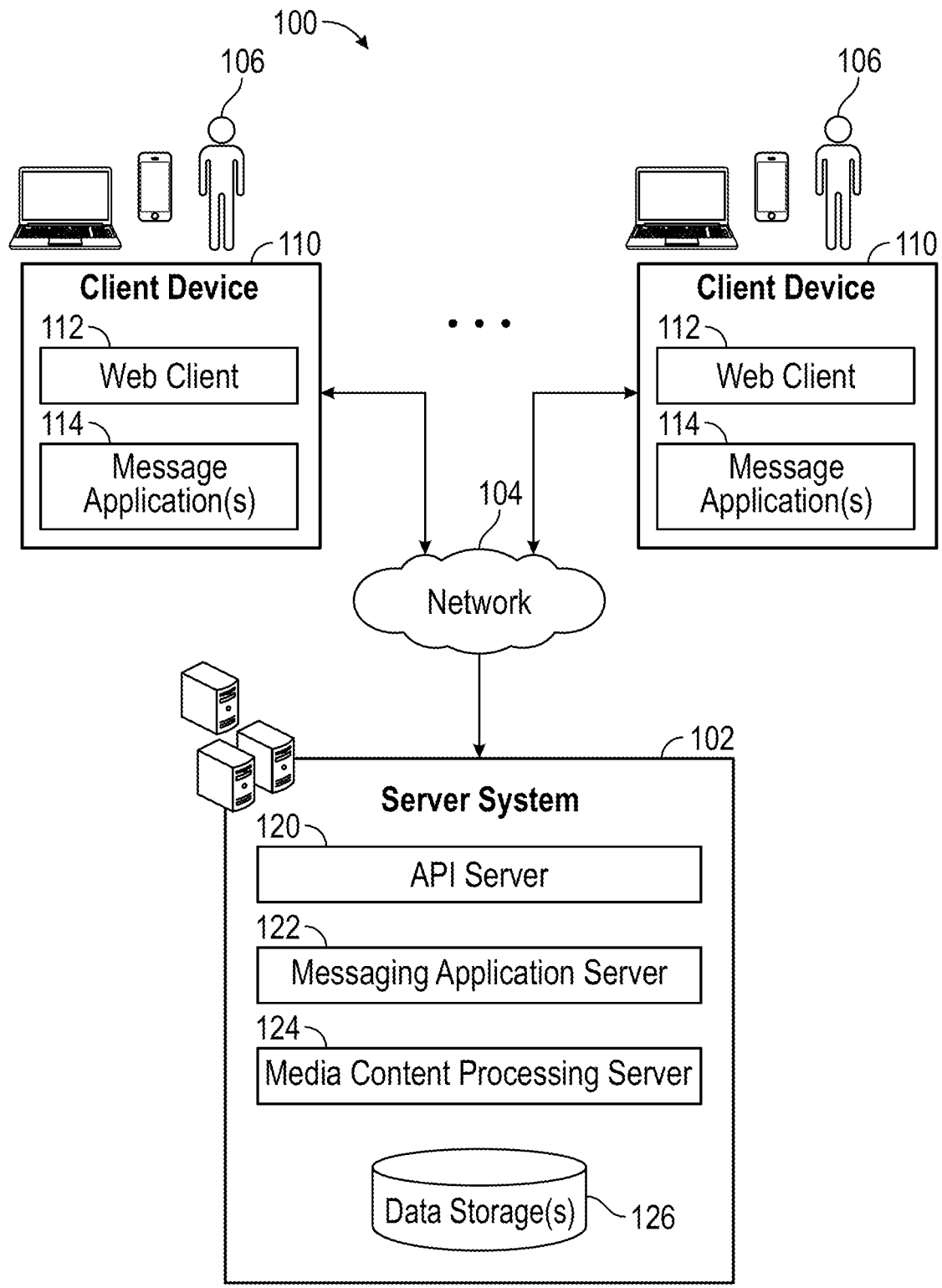
FIG. 1 is a block diagram illustrating a networked system for providing messaging services in a sample system.

Examples described herein relate to an audio recommendation system that allows users to browse an audio history in a messaging application to identify songs or sounds for inclusion in a playlist. The audio recommendation system adds a "recents" tab in a memory accessible to the messaging application including any audio tracks (songs or sounds) encountered by applications in order to allow quick access to any recently played songs or sounds provided in a message to/from another user or encountered during activities of the user. The displayed "recents" tab enables the user to revisit songs or sounds that the user may wish to use later in another message or to include in the user's music playlist. The "recents" tab also enables the user to browse an audio history in received messages without needing to explicitly save the music or sounds upon receipt.

In sample configurations, the system described herein implements methods including determining that a sound or song has been encountered in an application on the computing device, determining a source of the sound or song, storing the sound or song and the source of the sound or song in a portion of a memory of a computing device associated with a "recents" tab displayed on the computing device, and displaying the sound or song and the source of the sound or song in a playlist associated with the "recents" tab on a display of the computing device for user selection. The sound or song may be encountered in at least one of a messaging application, a music streaming application, or a music identification application. When not already identified, a song encountered by an application may be identified using a music identification service. On the other hand, an encountered sound may be named or otherwise identified by the user for inclusion in the playlist. A Global Positioning System or a timestamp may be used to identify at least one of where or when a particular song or sound was generated by or first heard by the user.

In other sample configurations, the "recents" tab may be presented to the display of the computing device when at least one of the sound or song is triggered in the application. The sounds or songs may be ordered in the playlist associated with the "recents" tab in reverse chronological order where the most recently encountered sound or song is at a top of the playlist. Also, an action menu with options for a sound or song in the playlist may be presented to the display when a user presses and holds on a selection in the playlist. The options for selection may include at least one of generating a report about a user's reaction to the selection, viewing a sound page that enables the user to see other content that uses the sound or song corresponding to the selection, or sending the selection to another user.

Although the various systems and methods are described herein with reference to a smartphone adapted to include a messaging application, the technology described may be applied to other mobile devices such as a tablets, watches, or cellular telephones.

The following detailed description includes systems, methods, techniques, instruction sequences, and computing machine program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and method described because the relevant teachings can be applied or practice in a variety of ways. The terminology and nomenclature used herein is for the purpose of describing particular aspects only and is not intended to be limiting. In general, well-known instruction instances, protocols, structures, and techniques are not necessarily shown in detail.

The terms "coupled" or "connected" as used herein refer to any logical, optical, physical, or electrical connection, including a link or the like by which the electrical or magnetic signals produced or supplied by one system element are imparted to another coupled or connected system element. Unless described otherwise, coupled or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element that is integrated into or supported by the element.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

FIG. 1 is a block diagram illustrating a networked system 100 for providing messaging services in a sample configuration. As shown, the system 100 may be configured to process media content items and to send and to receive messages that include the processed media content. In one example, the system 100 is a messaging system configured to receive a plurality of messages from a plurality of users 106, process media content contained in the messages, and send messages to one or more users 106 with the processed media content. In another example, the system 100 may capture one or more segments of an audio stream associated with media content contained in a message and enable the recipient to play the audio stream. The system 100 may also cause the audio stream to be identified using a music identification service and cause any information associated with the identification of the music to be displayed to a user, cause creative tools or services associated with the identification of the music to be presented to the user, and the like.

The system 100 may include one or more client devices such as client device 110. The client device 110 may also be referred to herein as a user device or a computing device. The client device 110 may comprise, but is not limited to, a mobile phone, a desktop computer, a laptop, a portable digital assistant (PDA), a smart phone, a tablet, an ultrabook, a netbook, a laptop, a multi-processor system, a microprocessor-based or programmable consumer electronic game console, set-top box, computer in a vehicle, or any other communication device that a user may utilize to access the system 100.

In an example, the client device 110 may comprise a display module (not shown) to display information (e.g., in the form of user interfaces). The display module or user interface may be used to display media content such as video, images (e.g., photographs), and the like. In further examples, the client device 110 may comprise one or more of touch screens, accelerometers, gyroscopes, cameras, microphones, global positioning system (GPS) devices, and so forth. The client device 110 may be a device of a user 106 that is used to generate content media items such as video, images (e.g., photographs), and audio, and to send and to receive messages containing such media content items to and from other users 106.

Users 106 may be a person, a machine, or other means of interacting with the client device 110. The user 106 need not be part of the system 100 but may interact with the system 100 via the client device 110 or other means. For instance, the user 106 may provide input (e.g., touch screen input or alphanumeric input) to the client device 110 and the input may be communicated to other entities in the system 100 (e.g., server system 102, other client devices 110, etc.) via a network 104. In this instance, the other entities in the system 100, in response to receiving the input from the user 106, may communicate information to the client device 110 via the network 104 to be presented to the user 106. In this way, the user 106 may interact with the various entities in the system 100 using the client device 110.

One or more portions of network 104 of the system 100 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WI-FI® network, a Wi-Max network, another type of network, or a combination of two or more such networks.

The client device 110 may access the various data and applications provided by other entities in the system 100 via web client 112 (e.g., a browser, such as the Internet Explorer® browser developed by Microsoft® Corporation of Redmond, Washington) or one or more messaging applications 114. The client device 110 may include one or more messaging applications 114 (also referred to as "apps") such as, but not limited to, a web browser, messaging application, electronic mail (email) application, an e-commerce site application, a mapping or location application, media content editing application, a media content viewing application, an audio recognition application, a messaging application (e.g., SNAPCHAT®) and the like. The client device 110 may also include other applications such as a music streaming application or a music identification application (e.g., SHAZAM!®)

In one example, a client application 114 may be a messaging application that allows a user 106 to take a photograph or video (or receive media content from a camera device external to the client device 110), add a caption, or otherwise edit the photograph or video, and then send the photograph or video to another user 106. The media content may comprise audio content such as music or sounds generated by the user 106. The messaging application 114 may further allow the user 106 to view photographs or video that the user 106 has taken via the client device 110, via a separate camera device, or to view photographs and video (e.g., in conventional video format or circular video format) that another user 106 has taken via a client device 110 or camera device. The message may be ephemeral and be removed from a receiving user device after viewing or after a predetermined amount of time (e.g., 10 seconds, 24 hours, etc.).

The messaging application 114 may further allow a user 106 to generate a gallery. A gallery may be a collection of media content such as photos and videos that may be viewed by other users "following" the user's gallery (e.g., subscribed to view and receive updates in the user's gallery). The gallery also may be ephemeral (e.g., lasting 24 hours, lasting a duration of an event (e.g., during a music concert, sporting event, etc.), or other predetermined time). Also, as explained below, the messaging application 114 may be adapted to provide a playlist of audio content based on the activity of the user.

An ephemeral message may be associated with a message duration parameter, the value of which determines an amount of time that the ephemeral message will be displayed to a receiving user of the ephemeral message by the client application 110. The ephemeral message may be further associated with a message receiver identifier and a message timer. The message timer may be responsible for determining the amount of time the ephemeral message is shown to a particular receiving user 106 identified by the message receiver identifier. For example, the ephemeral message may only be shown to the relevant receiving user 106 for a time period determined by the value of the message duration parameter. In another example, the messaging application 114 may allow a user 106 to store photographs and videos and to generate a gallery that is not ephemeral and that can be sent to other users. For example, to assemble photographs and videos from a recent vacation to share with friends and family.

In some sample systems, one or more messaging applications 114 may be included in a given one of the client devices 110 and configured to locally provide the user interface and at least some of the functionalities with the messaging application 114 configured to communicate with other entities in the system 100 (e.g., server system 102) on an as needed basis, for data and processing capabilities not locally available (e.g., access location information, authenticate a user 106, verify a method of payment, access media content stored on a server, synchronize media content between the client device 110 and a server computer, identify audio content, etc.). Conversely, one or more messaging applications 114 may not be included in the client device 110. In such as case, the client device 110 may use its web client 112 to access the one or more messaging applications 114 hosted on other entities in the system 100 (e.g., server system 102).

Media content such as images and video may be captured via at least one of the client device 110 (e.g., via a camera of the client device) or via a separate camera device. The camera device may be a standalone camera, or may be a wearable device, such as an electronic-enabled watch, key fob, eyewear device, and the like. The camera device also may be an electronic enabled eyewear device, such as so-called smart glasses (e.g., SNAP SPECTACLES®).

The system 100 may further include a server system 102 that may provide server-side functionality via the network 104 (e.g., the Internet or wide area network (WAN)) to one or more client devices 110. The server system 102 may include an application programming interface (API) server 120, a messaging application server 122, and a media content processing server 124, which may each be communicatively coupled with each other and with one or more data storage(s) 126. The server system 102 may be in a cloud computing environment in some systems. The server system 102, and any servers associated with the server system 102, also may be associated with a cloud-based application in another example. The one or more data storages 126 may be storage devices that store information such as untreated media content, original media content from users 106 (e.g., high quality media content), processed media content (e.g., media content that is formatted for sharing with client devices 110 and viewing on client devices 110), user information, user device information, audio content information (e.g., titles, artist, album cover art, audio fingerprints, etc.) and so forth. The one or more data storages 126 also may include cloud-based storage external to the server system 102 (e.g., hosted by one or more third party entities external to the server system 102). The data storages 126 may include databases, blob storages, and so forth.

The media content processing server 124 may provide functionality to perform various processing of media content items. The media content processing server 124 may access one or more data storages 126 to retrieve stored data to use in processing media content and to store results of processed media content. The media content processing server 124 may provide functionality to, for example, identify music in audio content (e.g., implementing a music recognition service such as SHAZAM! ®), to enable the storage and access to music via a music streaming service, and the like.

The messaging application server 122 may be responsible for generation and delivery of messages between users 106 of client devices 110. The messaging application server 122 may utilize any one of a number of message delivery networks and platforms to deliver messages to users 106. For example, the messaging application server 122 may deliver messages using electronic mail (email), instant message (IM), Short Message Service (SMS), text, facsimile, or voice (e.g., Voice over IP (VoIP)) messages via wired (e.g., the Internet), plain old telephone service (POTS), or wireless networks (e.g., mobile, cellular, WI-FI® Long Term Evolution (LTE), Bluetooth).

In use, a user 106 may wish to share various media content items (e.g., videos, audio content, images, etc.) with one or more other users 106. For example, the user 106 may use the client device 110 or other device (e.g., a camera) to take various videos and photographs that the user 106 may want to share with friends and family. The user 106 may utilize a messaging application 114 on the client device 110 to select the media content items for sharing.

The user 106 may also edit the various media content items using the messaging application 114. For example, the user 106 may add text to the media content item, choose an overlay for the media content item (labels, drawings, other artwork, etc.), may draw on the media content item, crop or alter (e.g., red-eye reduction, focus, color adjustment, etc.) the media content item, and so forth. A media content item that is "untreated" refers to a media content item that has not been edited using the messaging application 114. The media content item may also be modified by the messaging application to include music or other sounds generated by the user 106. In an example, the media content processing server 124 may identify the music that the user 106 uses to modify the media content so that the recipient of the message may receive an indication of the title and artist of a song that has been attached to the media content. The messaging application 114 also may provide media overlays or other content editing functionality or services related to the music playing, and so forth. The messaging application 114 may provide such functionality directly via the messaging application 114 or other applications on the client device 110 or may utilize functionality provided by server system 102 (e.g., via media content processing server 124) to provide such functionality.

The user 106 may select the media content items for sharing with friends and family via the messaging application 114. Once the media content items have been selected, the user 106 may indicate that the media content items are to be shared. For example, the user 106 may choose an option on a user interface of the messaging application 114 (e.g., menu item, button, etc.) to indicate that the media content items are to be shared.

The user 106 may view media content via the messaging application 114. For example, the user 106 may view media content that has been captured on the client device 110 (e.g., via a camera of the client device 110), the user 106 may view media content captured by others and sent to the user 106, and the user 106 may view media content captured by a camera of the client device 110.

Figure 2:
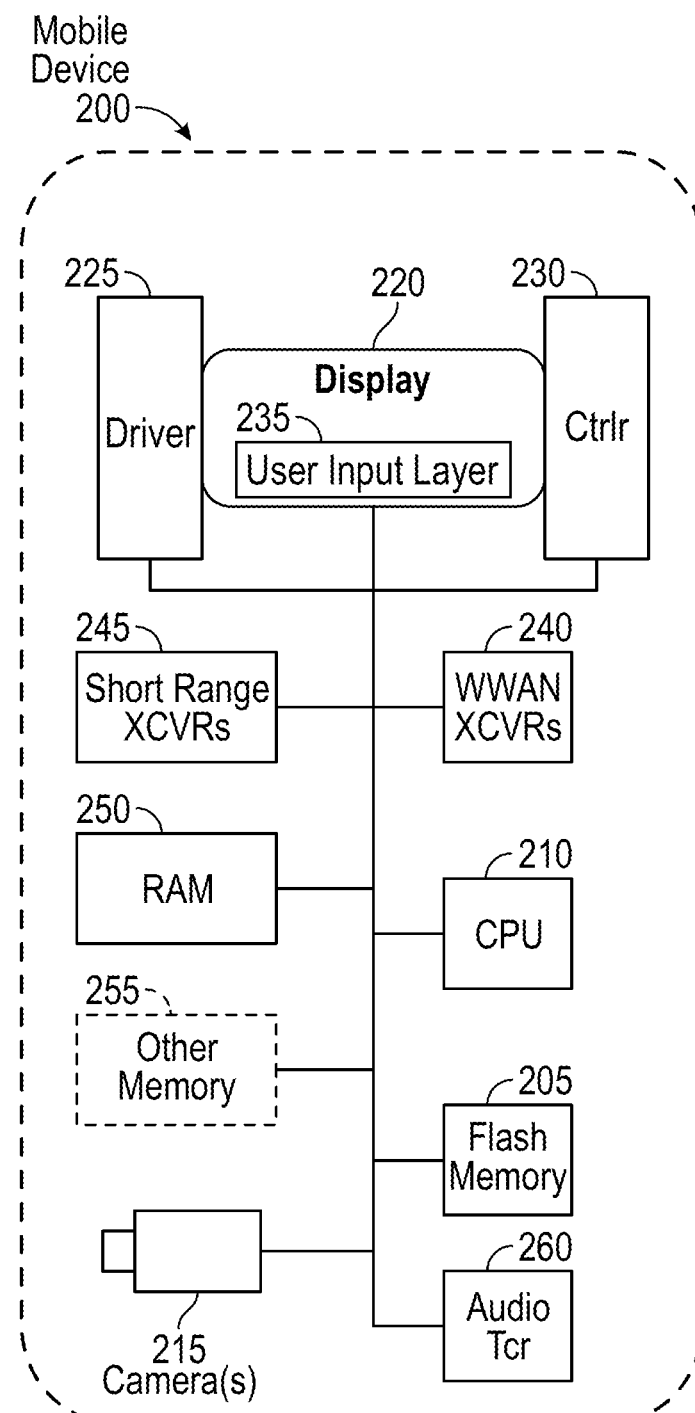
FIG. 2 is a high-level functional block diagram of an example mobile device.

FIG. 2 is a high-level functional block diagram of an example mobile device 200 that user 106 may use as the client device 110. Mobile device 200 may include a flash memory 205 that stores programming to be executed by the CPU 210 to perform all or a subset of the functions described herein. The mobile device 200 may further include a camera 215 that comprises one or more visible-light cameras (first and second visible-light cameras with overlapping fields of view) or at least one visible-light camera and a depth sensor with substantially overlapping fields of view. Flash memory 205 may further include multiple images or video, which are generated via the camera 215.

The mobile device 200 may further include an image display 220, a mobile display driver 225 to control the image display 220, and a display controller 230. In the example of FIG. 2, the image display 220 may include a user input layer 235 (e.g., a touchscreen) that is layered on top of or otherwise integrated into the screen used by the image display 220. Examples of touchscreen-type mobile devices that may be used include (but are not limited to) a smart phone, a personal digital assistant (PDA), a tablet computer, a laptop computer, or other portable device. However, the structure and operation of the touchscreen-type devices is provided by way of example; the subject technology as described herein is not intended to be limited thereto. For purposes of this discussion, FIG. 2 therefore provides a block diagram illustration of the example mobile device 200 with a user interface that includes a touchscreen input layer 235 for receiving input (by touch, multi-touch, or gesture, and the like, by hand, stylus, or other tool) and an image display 220 for displaying content.

As shown in FIG. 2, the mobile device 200 includes at least one digital transceiver (XCVR) 240, shown as WWAN XCVRs, for digital wireless communications via a wide-area wireless mobile communication network. The mobile device 200 may also include additional digital or analog transceivers, such as short-range transceivers (XCVRs) 245 for short-range network communication, such as via NFC, VLC, DECT, ZigBee, Bluetooth™, or WI-FI®. For example, short range XCVRs 245 may take the form of any available two-way wireless local area network (WLAN) transceiver of a type that is compatible with one or more standard protocols of communication implemented in wireless local area networks, such as one of the WI-FI® standards under IEEE 802.11.

To generate location coordinates for positioning of the mobile device 200, the mobile device 200 also may include a global positioning system (GPS) receiver. Alternatively, or additionally the mobile device 200 may utilize either or both the short range XCVRs 245 and WWAN XCVRs 240 for generating location coordinates for positioning. For example, cellular network, WI-FI®, or Bluetooth™ based positioning systems may generate very accurate location coordinates, particularly when used in combination. Such location coordinates may be transmitted to the mobile device 200 over one or more network connections via XCVRs 240, 245.

The transceivers 240, 245 (i.e., the network communication interface) may conform to one or more of the various digital wireless communication standards utilized by modern mobile networks. Examples of WWAN transceivers 240 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." The transceivers may also incorporate broadband cellular network technologies referred to as "5G." For example, the transceivers 240, 245 provide two-way wireless communication of information including digitized audio signals, still image and video signals, web page information for display as well as web-related inputs, and various types of mobile message communications to/from the mobile device 200.

The mobile device 200 may further include a microprocessor that functions as the central processing unit (CPU) 210. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU 210. The CPU 210, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 210 or processor hardware in smartphone, laptop computer, and tablet.

The CPU 210 serves as a programmable host controller for the mobile device 200 by configuring the mobile device 200 to perform various operations, for example, in accordance with instructions or programming executable by CPU 210. For example, such operations may include various general operations of the mobile device 200, as well as operations related to the programming for applications on the mobile device 200. Although a processor may be configured by use of hardwired logic, typical processors in mobile devices are general processing circuits configured by execution of programming.

The mobile device 200 further includes a memory or storage system, for storing programming and data. In the example shown in FIG. 2, the memory system may include a flash memory 205, a random-access memory (RAM) 250, and other memory components 255, as needed. The RAM 250 may serve as short-term storage for instructions and data being handled by the CPU 210, e.g., as a working data processing memory. The flash memory 205 typically provides longer-term storage.

Hence, in the example of mobile device 200, the flash memory 205 may be used to store programming or instructions for execution by the CPU 210. Depending on the type of device, the mobile device 200 stores and runs a mobile operating system through which specific applications are executed. Examples of mobile operating systems include Google Android, Apple iOS (for iPhone or iPad devices), Windows Mobile, Amazon Fire OS, RIM BlackBerry OS, or the like.

Finally, the mobile device 200 may include an audio transceiver 260 that may receive audio signals from the environment via a microphone (not shown) and provide audio output via a speaker (not shown). As will be explained further below, audio signals may be coupled with video signals and other messages by a messaging application 114 implemented on the mobile device 200.

In sample configurations, the messaging application 114 is adapted to include an audio recommendation system that allows users to browse an audio history to identify songs or sounds for inclusion in a playlist. For example, a user may use the messaging application to generate a message that may or may not include a video image. Music or other sounds may be added to the message either before or after the text or video image is captured and before the message is shared with other users. In a sample configuration, the messaging application may have a relationship with music providers to provide access to a database of songs, which may be stored, for example, in the data storage 126 and accessed by the media content processing server 124 shown in FIG. 1. The media content processing server 124 may provide information about any song included in the message. Such information may include the album art, the song title, the name of the artist, and the like. The message may include a link to play the song on the user's messaging system 114 on the user's mobile device 200. For example, the messaging system 114 may include a digital streaming platform for playing the songs retrieved from the data storage 126. Sample music streaming services are well known to those skilled in the art and include music streaming services such as SPOTIFY®, APPLE MUSIC®, and SOUNDCLOUD®.

In a sample configuration, the user 106 generates a message using the messaging application 114 and then elects to add music or other sounds to the message by, for example, selecting a music icon that takes the user 106 to a sound interface that provides access to the music stored, for example, in the data storage 126. The user 106 selects the desired music for inclusion in the message, and the music is integrated into the message. On the other hand, the user 106 may elect to generate sounds or music for inclusion with the message. In such case, the sounds or music are captured by a microphone of the mobile device 200 and included in the message. The message including the music or sounds is then transmitted to another user of the messaging system in a conventional fashion.

Upon receipt of the message with music or sound, the user 106 may select to play the audio with a received text or video message by selecting "play." The message is played and, in the case of ephemeral messaging systems, the message may be maintained for a designated period of time before being discarded. In messaging systems of the type described herein, the message may be maintained in a recently viewed queue until discarded.

The audio recommendation system described herein adds a "recents" tab in a memory accessible to the messaging system including the audio tracks (songs or sounds) in order to allow quick access to any recently played songs or sounds provided in a message to/from another user or encountered during activities of the user. The displayed "recents" tab enables the user to revisit songs or sounds that the user may wish to use later in another message or to include in the user's playlist. The "recents" tab also enables the user to browse an audio history in received messages without needing to explicitly save the music or sounds upon receipt.

In a sample configuration, a received song or sound will appear in the "recents" tab from a number of sources. For example, the song or sound may be a song or sound that the user has used in a message sent to a friend or included in a Story or Spotlight feature in messaging applications such as SNAPCHAT®. The "recents" tab also may include a song that the user has identified using a music identification service such as SHAZAM!® or may include a song or sound received in a message from another user. The "recents" tab also may store songs or sounds that the user has listened to on the user's computing device either within the messaging application or within an audio application. The "recents" tab may be configured to appear to the user when at least one of these sound or music sources is triggered in the messaging application. The resulting playlist associated with the "recents" tab may be ordered in reverse chronological order where the most recently encountered song or sound is on top; however, other orderings such as alphabetical by title or by artist may also be used.

In a sample configuration, the user may select a song or sound in the playlist associated with the "recents" tab by swiping the desired song or sound in the playlist for playback. In accordance with a sample implementation, the song or sound in the playlist may further include additional text explaining why the sound or song is in the playlist. For example, if the playlist includes a song that the user identified using a music identification service such as SHAZAM!®, the playlist may include the song title and artist as determined by the music identification service, as well as an indication that the song is in the playlist because the user used the SHAZAM!® music identification service to identify the song. Similarly, if the song or sound was received in a message from another user, the playlist would identify from whom the song or sound was received. The songs and sounds so saved to the playlist of the "recents" tab become recommended songs and sounds for the user that are based on the user's activity.

Other functionality may be associated with the songs or sounds in the "recents" tab playlist. For example, a user may press and hold on any selection in the playlist of the "recents" tab to display on the display of the mobile device 110 an action menu with options for that song or sound.

One option in the action menu may be to generate a report. Selecting "report" from the action menu opens a report webview with a list of reporting reasons. Such reporting reason may include, for example, that the user does not like the song, that the song should be removed from the messaging service, that the message is promoting fraudulent information, that the song infringes on intellectual property, and the like.

Another option in the action menu may be to view a sound page. Selecting "view sound page" may open a sound page that enables the user to see all content that uses a particular sound or song to explore the ways that users of the messaging application are using that sound or song.

Yet another option in the action menu may be to send the selected song or sound to another user. Selecting "send to" may open a send-to page that enables the user to send the selected song or sound to another user.

Figure 3A:
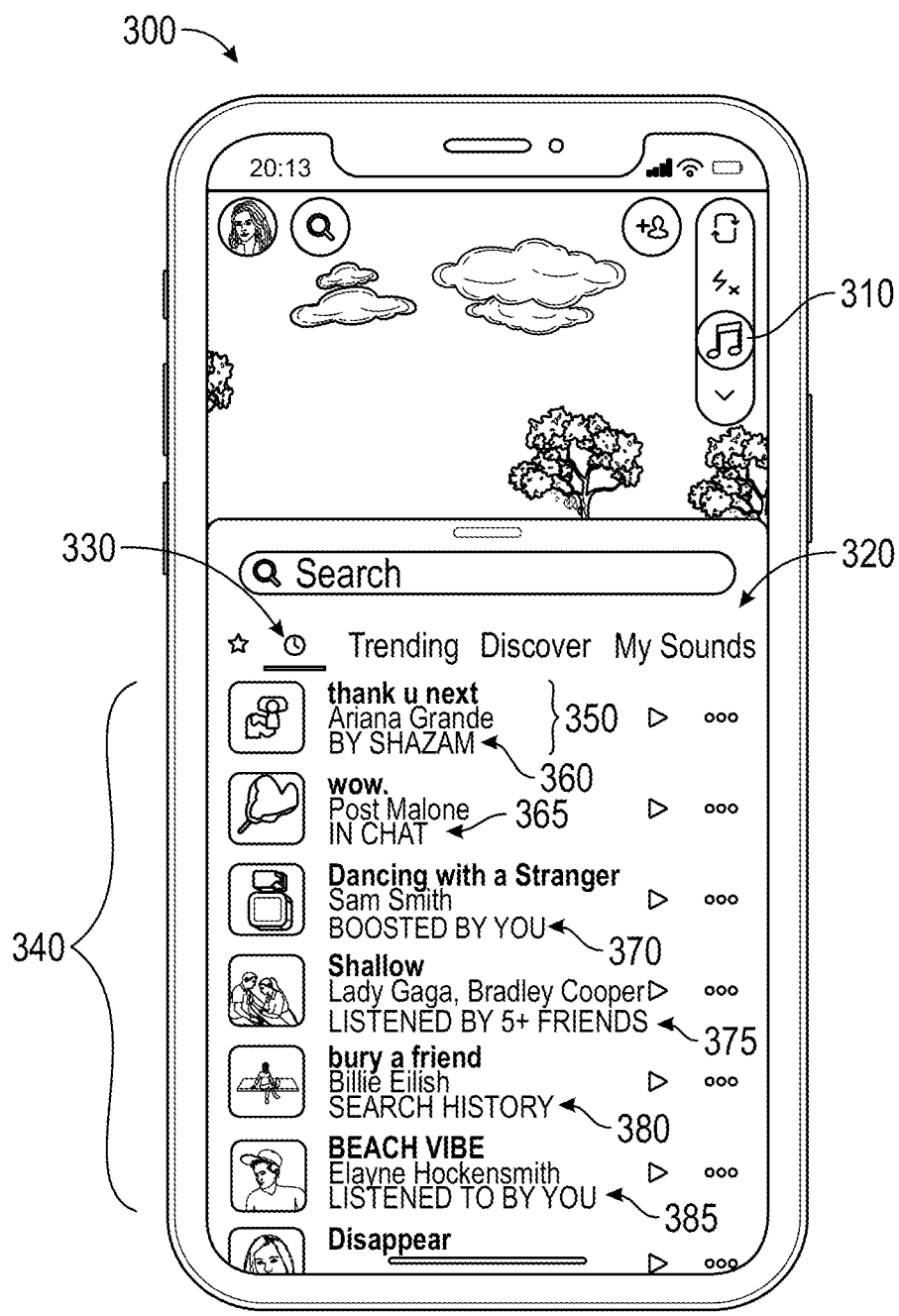
FIG. 3A illustrates a sample interface for a messaging application including a "recents" tab.

FIG. 3A illustrates a sample interface 300 for a messaging application including a "recents" tab. As illustrated, the messaging application includes a music icon 310 that, upon selection, takes the user to an interface 320 including a "recents" tab 330. As illustrated, the "recents" tab 330 includes a playlist 340 in reverse chronological order listing the song or sounds where the most recently encountered song 350 or sound is on top of the list. As illustrated, a song may be listed by title and artist for those cases where the song was obtained from a music streaming service or has been identified by a music identification service. For example, the playlist 340 lists the respective songs by title and artist. Customized sounds generated by the user may be labeled or simply identified by source and time of generation, for example.

In a sample configuration, the playlist shown in FIG. 3A also explains why the sound or song is in the playlist 340.

For example, the most recently encountered song 350 (thank u next by Ariane Grande) is in the list because the user used a music identification service (in this case, the SHAZAM!® music identification service) to identify the song's name and artist. The entry for the most recently encountered song 350 thus indicates in the third line that the song is in the list because the user identified the song using the SHAZAM!® music identification service, as indicated at 360 ("by Shazam"). Similarly, the song may be in the playlist 340 because the song was received in a chat from another user of the messaging application 114 at 365, because the song was boosted by a Spotlight boost of the user's or another user's messaging story of the messaging application 114 at 370, because the song was listened to by several of the user's social media friends at 375, because the user searched for the song in the messaging application 114 or a separate music streaming application and the song appeared in a search at 380, because the user listened to the song using a separate music streaming application at 385, and the like. Alternatively, at least one of the Global Positioning System of the mobile phone 200 or a timestamp may be used to identify at least one of where or when a particular song or sound was heard. Such information provides a more contextual search to enable the user to find recently used audio clips. Once the audio clip has been found, the user may elect to access the entire song or sound clip from the source.

Figure 3B:
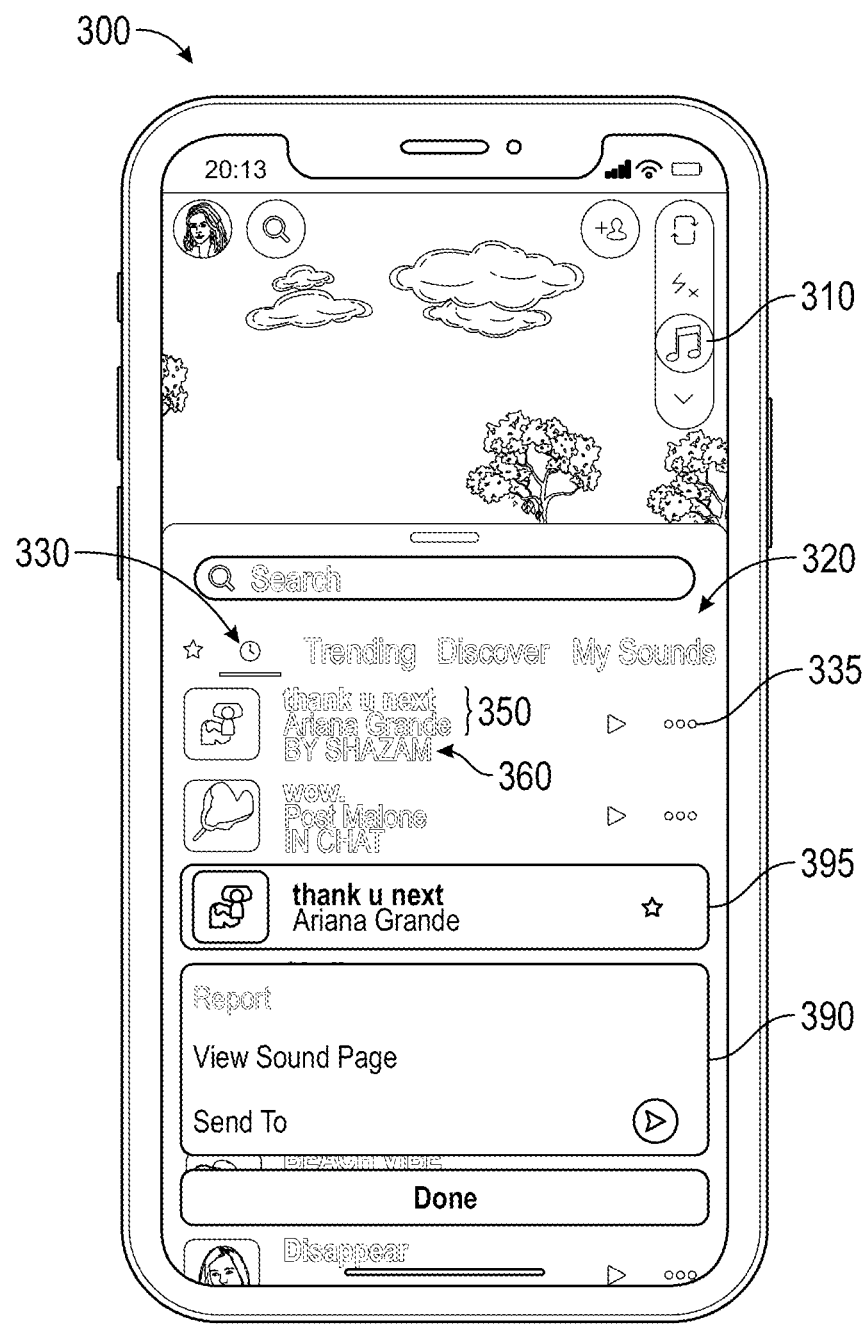
FIG. 3B illustrates the sample interface of FIG. 3A where the user has selected the action menu of the "recents" tab.

FIG. 3B illustrates the sample interface 300 where the user has selected the action menu 390 of the "recents" tab 330 by selecting the ellipsis 335. As noted above, the user may elect to generate a report, view a sound page, or send the selected song or sound to another user. The user also may elect to add a song to a list of the user's favorites. For example, at 395 the song "thank u next" by Ariana Grande is selected for adding to the user's list of favorites.

Figure 3C:
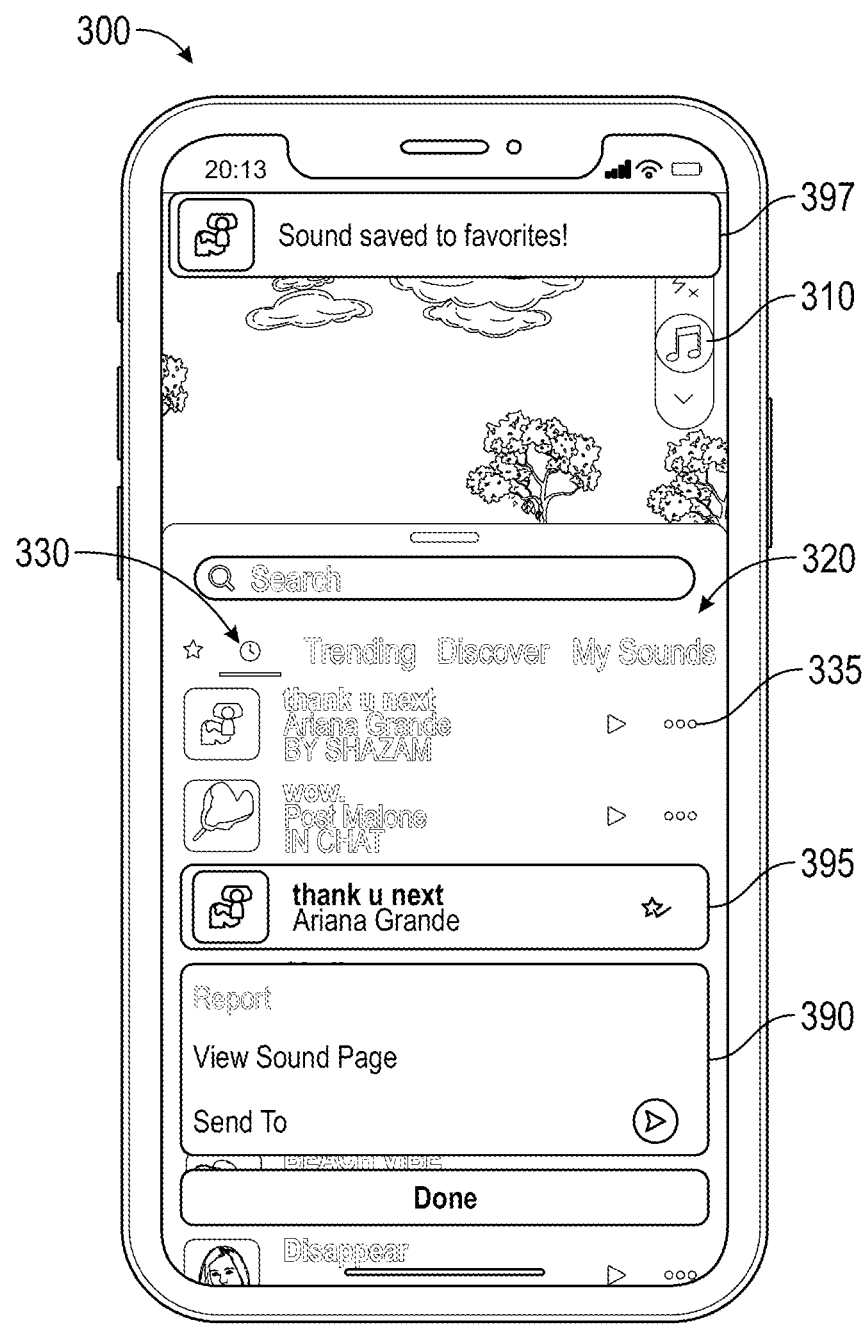
FIG. 3C illustrates the sample interface of FIG. 3A where the user has selected the action menu of the "recents" tab and elected to include the selected song in "favorites."

FIG. 3C illustrates the sample interface 300 where the user has selected the action menu of the "recents" tab 330 by selecting the ellipsis 335 and elected to include the selected song in "favorites." The indicator 397 confirms that the song has been saved as a favorite. Such a "favorites" tab allows quick access to the user's favorite songs and sounds. The "favorites" playlist thus enables the user to save a song or a sound for use later in a message or to build out a playlist of the user's favorite sounds that the user likes to listen to or to use in messages. The "recents" tab enables the user to easily find such songs or sounds for inclusion in the "favorites" playlist.

Figure 4:
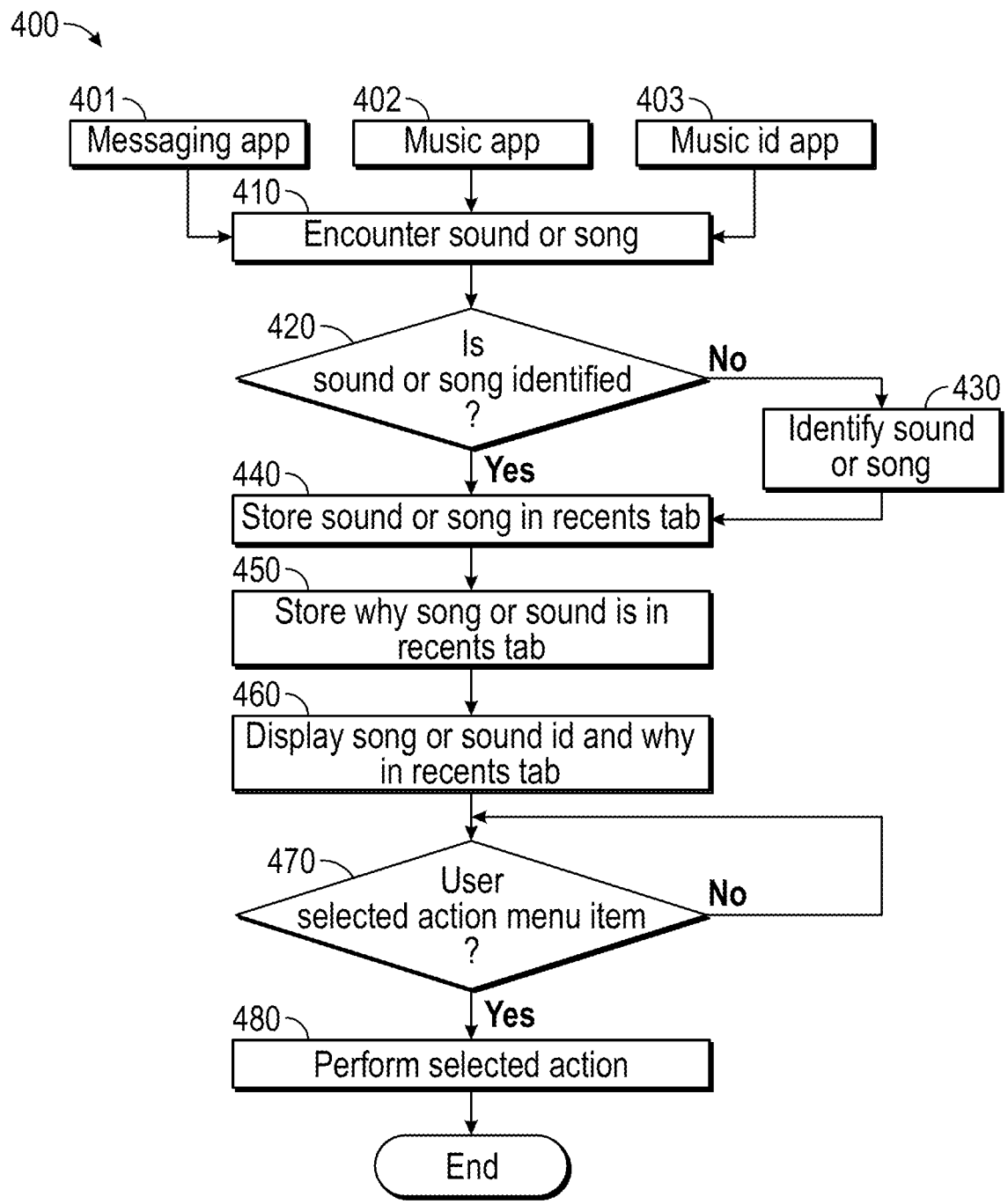
FIG. 4 illustrates a flow chart for implementing an audio recommendation system associated with a messaging system in a sample implementation.

FIG. 4 illustrates a flow chart for implementing an audio recommendation system 400 associated with a messaging system in a sample implementation. As illustrated, the application receives input from at least one of a messaging application 401, a music streaming application 402, or a music identification application 403 indicating that the user of the associated mobile device 110 has encountered a song or sound using one or more of these applications. As noted above, the encountered song or sound may be a song or sound that the user has used in a message sent to a friend, received in a message from another user, included in a Story or Spotlight feature, or simply listened to in a messaging application 401 such as SNAPCHAT®. On the other hand, the encountered song or sound may be a sound or song that the user has listened to on a music streaming application 402 on the user's mobile phone. The encountered song also may be a song that the user has identified using a music identification application 403 such as SHAZAM!®.

When it has been determined at 410 that such a sound or song has been encountered by the user, a determination is made at 420 as to whether the sound or song has been identified. If not, the sound or song may be identified at 430. For example, if the sound is a sound generated by the user or by another user and provided in a message, the sound may be given a name (e.g., Steve's screech) or other identifying information. In addition, at least one of the Global Positioning System of the mobile phone 200 or a timestamp may be used to identify at least one of where or when a particular song or sound was generated by or first heard by the user. While such identification is desirable to facilitate searching, such sound identification is not required. On the other hand, an encountered song may be identified using a music identification service such as SHAZAM!®.

The identified sound or song may be stored at 440 in a portion of the memory of the messaging application 401 associated with the "recents" tab. As noted above, the "recents" tab may be configured to appear to the user on the display of the computing device when at least one of the sound or music sources 401-403 is triggered. The resulting playlist in the "recents" tab may be ordered in reverse chronological order where the most recently encountered song or sound is on top, alphabetically by title or by artist, or in any other desired order.

Another line may be added to the entries in the playlist of the "recents" tab at 450 indicating why the sound or song has been stored in the "recents" tab. An encountered sound or song stored in the "recents" tab at 440 may be provided with an identification of its source (e.g., messaging application 401, music streaming application 402, or music identification application 403) that is stored at 450 so that the user may more readily browse the "recents" tab to search the recent audio history based on activity in these applications without needing to explicitly save the music or sounds upon generation, playback, or upon sending or receiving.

The sound or song identification and why the song or sound is in the "recents" tab may then be displayed as a playlist on the user's mobile phone 110 at 460. As noted above, the playlist may be ordered in reverse chronological order where the most recently encountered song or sound is on top, alphabetically by title or by artist, or in any other desired order.

The user then has the option of taking an action on the items in the playlist. For example, at 470, a determination is made whether the user has selected the action item menu from the playlist. Once an action menu option is selected at 470, the appropriate action is taken at 480. For example, the user may elect to generate a report, to view a sound page, to send the selected song or sound to another user, or to add the selected sound or song to the user's "favorites" list.

The steps in FIG. 4 may be performed by one or more of CPU 210 of mobile device 200 or a processor 610 of a computing system such as server system 102, upon loading and executing software code or instructions which are tangibly stored on a tangible computer readable medium (i.e., non-transitory), such as on a magnetic medium, e.g., a computer hard drive, an optical medium, e.g., an optical disc, solid-state memory, e.g., flash memory, or other storage media known in the art. Thus, any of the functionality performed by the CPU 210 of mobile device 200 or a processor 610 of a computing system such as server system 102 described herein, such as the steps in FIG. 4, may be implemented in software code or instructions that are tangibly stored on a tangible computer readable medium. Upon loading and executing such software code or instructions by the processors, the devices including the processors may perform any of the functionality of the devices described herein, including the steps in FIG. 4 described herein.

Figure 5:
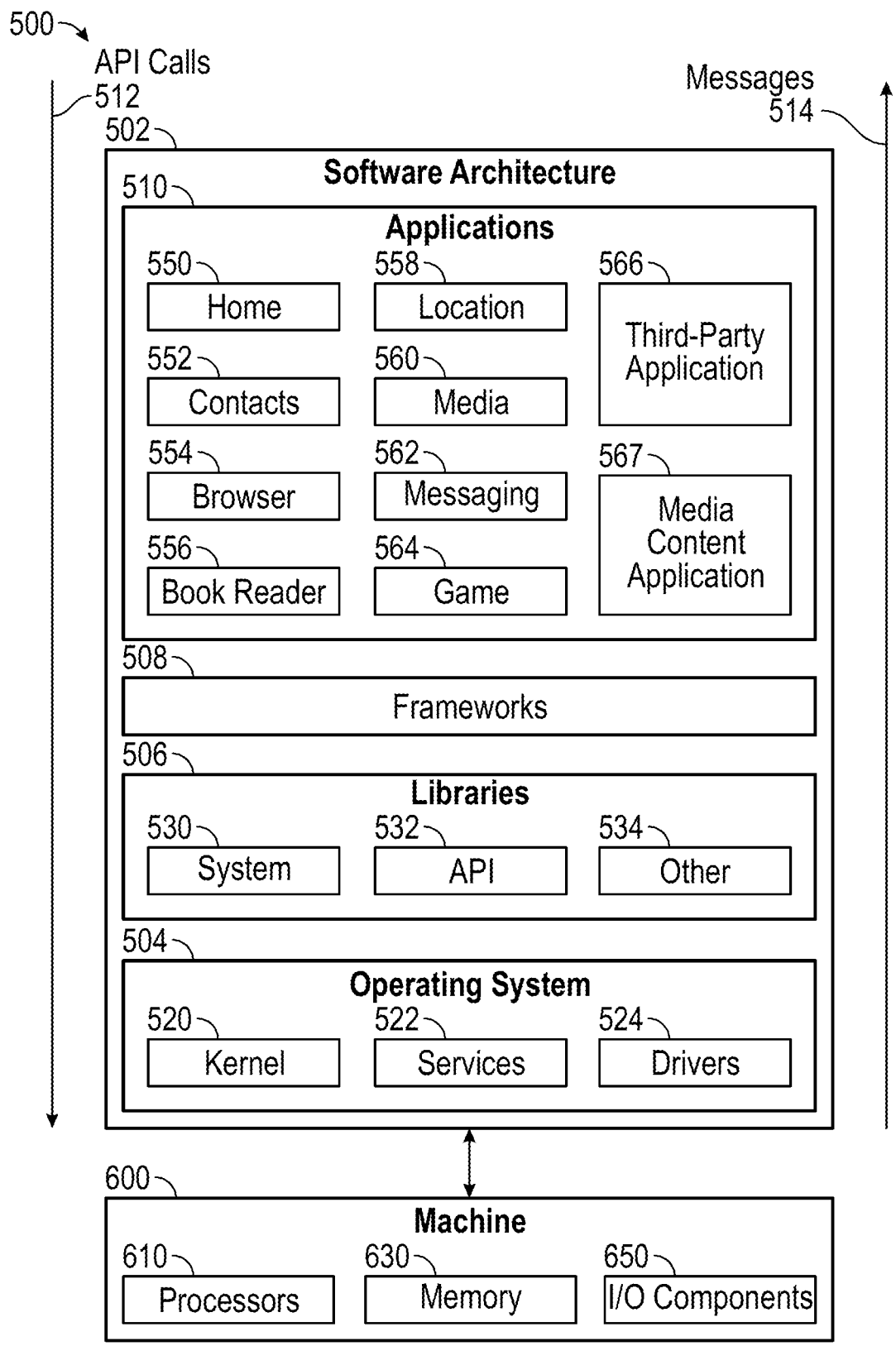
FIG. 5 is a block diagram illustrating a sample software architecture that may be installed on a machine to implement the system described herein.

FIG. 5 is a block diagram 500 illustrating software architecture 502, which can be installed on any one or more of the devices described above. For example, in various system configurations, client devices 110 and server systems 102, 120, 122, and 124 may be implemented using some or all of the elements of software architecture 502. FIG. 5 is merely a non-limiting example of a software architecture, and it will be appreciated that many other architectures can be implemented to facilitate the functionality described herein. In various system configurations, the software architecture 502 is implemented by hardware such as machine 600 of FIG. 6 that includes processors 610, memory 630, and input/output (I/O) components 650. In this example, the software architecture 502 can be conceptualized as a stack of layers where each layer may provide a particular functionality. For example, the software architecture 502 includes layers such as an operating system 504, libraries 506, frameworks 508, and applications 510. Operationally, the applications 510 invoke application programming interface (API) calls 512 through the software stack and receive messages 514 in response to the API calls 512, consistent with some system configurations.

In various implementations, the operating system 504 manages hardware resources and provides common services. The operating system 504 includes, for example, a kernel 520, services 522, and drivers 524. The kernel 520 acts as an abstraction layer between the hardware and the other software layers, consistent with some system configurations. For example, the kernel 520 provides memory management, processor management (e.g., scheduling), component management, networking, and security settings, among other functionality. The services 522 can provide other common services for the other software layers. The drivers 524 are responsible for controlling or interfacing with the underlying hardware, according to some system configurations. For instance, the drivers 524 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some system configurations, the libraries 506 provide a low-level common infrastructure utilized by the applications 510. The libraries 506 can include system libraries 530 (e.g., C standard library) that can provide functions such as memory allocation functions, string manipulation functions, mathematic functions, and the like. In addition, the libraries 506 can include API libraries 532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in graphic content on a display), database libraries (e.g., SQLite to provide various relational database functions), web libraries (e.g., WebKit to provide web browsing functionality), and the like. The libraries 506 can also include a wide variety of other libraries 534 to provide many other APIs to the applications 510.

The frameworks 508 provide a high-level common infrastructure that can be utilized by the applications 510, according to some system configurations. For example, the frameworks 508 provide various graphic user interface (GUI) functions, high-level resource management, high-level location services, and so forth. The frameworks 508 can provide a broad spectrum of other APIs that can be utilized by the applications 510, some of which may be specific to a particular operating system 504 or platform.

In an example system configuration, the applications 510 include a home application 550, a contacts application 552, a browser application 554, a book reader application 556, a location application 558, a media application 560, a messaging application 562, a game application 564, and a broad assortment of other applications such as a third-party application(s) 566 and media content application 567. According to some system configurations, the applications 510 are programs that execute functions defined in the programs. Various programming languages can be employed to generate one or more of the applications 510, structured in a variety of manners, such as object-oriented programming languages (e.g., Objective-C. Java, or C++) or procedural programming languages (e.g., C or assembly language). In a specific example, the third-party application 566 (e.g., an application developed using the ANDROID™ or IOS™ software development kit (SDK) by an entity other than the vendor of the particular platform) may be mobile software running on a mobile operating system such as IOS™. ANDROID™, WINDOWS® Phone, or another mobile operating system. In this example, the third-party application 566 can invoke the API calls 512 provided by the operating system 504 to facilitate functionality described herein.

As explained above, some system configurations may particularly include a messaging application 562. In certain system configurations, this may be a stand-alone application that operates to manage communications with a server system such as server system 102. In other system configurations, this functionality may be integrated with another application such as a media content application 567. Messaging application 562 may request and display various media content items and may provide the capability for a user to input data related to media content items via a touch interface, keyboard, or using a camera device of machine 600, communication with a server system via I/O components 650, and receipt and storage of media content items in memory 630. Presentation of media content items and user inputs associated with media content items may be managed by messaging application 562 using different frameworks 508, library 506 elements, or operating system 504 elements operating on a machine 600.

Figure 6:
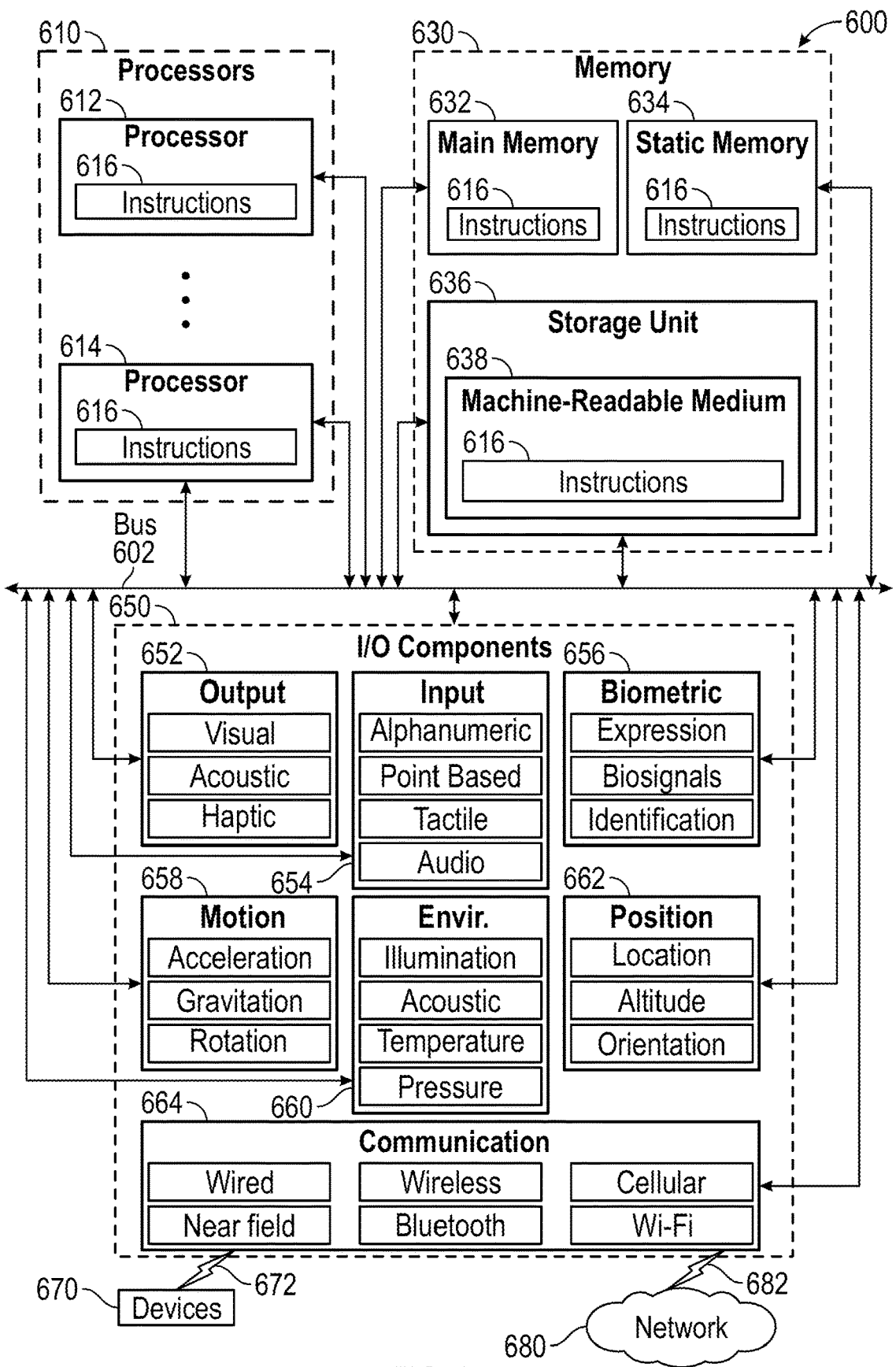
FIG. 6 is a block diagram of a machine in the form of a computer system that executes instructions for causing the machine to implement samples of the audio recommendation system described herein.

FIG. 6 is a block diagram illustrating components of a machine 600, according to some system configurations, that can read instructions from a machine-readable medium (e.g., a machine-readable storage medium) and perform any one or more of the methodologies discussed herein. FIG. 6 shows a diagrammatic representation of the machine 600 in the example form of a computer system that executes instructions 616 (e.g., software, a program, an application 510, an applet, an app, or other executable code) for causing the machine 600 to perform any one or more of the methodologies discussed herein. In alternative system configurations, the machine 600 operates as a standalone device or can be coupled (e.g., networked) to other machines. In a networked deployment, the machine 600 may operate in the capacity of a server machine 102, 120, 122, 124, etc., or a client device 110 in a server-client network environment, or as a peer machine in a peer-to-peer (or distributed) network environment. The machine 600 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

In various system configurations, the machine 600 comprises processors 610, memory 630, and I/O components 650 that can be configured to communicate with each other via a bus 602. In an example system configuration, the processors 610 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 612 and a processor 614 that may execute the instructions 616. The term "processor" is intended to include multi-core processors 610 that may comprise two or more independent processors 612, 614 (also referred to as "cores") that can execute instructions 616 contemporaneously. Although FIG. 6 shows multiple processors 610, the machine 600 may include a single processor 610 with a single core, a single processor 610 with multiple cores (e.g., a multi-core processor 610), multiple processors 612, 614 with a single core, multiple processors 612, 614 with multiples cores, or any combination thereof.

The memory 630 comprises a main memory 632, a static memory 634, and a storage unit 636 accessible to the processors 610 via the bus 602, according to some system configurations. The storage unit 636 can include a machine-readable medium 638 on which are stored the instructions 616 embodying any one or more of the methodologies or functions described herein. The instructions 616 can also reside, completely or at least partially, within the main memory 632, within the static memory 634, within at least one of the processors 610 (e.g., within the processor's cache memory), or any suitable combination thereof, during execution thereof by the machine 600. Accordingly, in various system configurations, the main memory 632, the static memory 634, and the processors 610 are considered machine-readable media 638.

As used herein, the term "memory" refers to a machine-readable medium 638 able to store data temporarily or permanently and may be taken to include, but not be limited to, random-access memory (RAM), read-only memory (ROM), buffer memory, flash memory, and cache memory. While the machine-readable medium 638 is shown, in an example system configuration, to be a single medium, the term "machine-readable medium" should be taken to include a single medium or multiple media (e.g., a centralized or distributed database, or associated caches and servers) able to store the instructions 616. The term "machine-readable medium" also shall be taken to include any medium, or combination of multiple media, that is capable of storing instructions (e.g., instructions 616) for execution by a machine (e.g., machine 600), such that the instructions 616, when executed by one or more processors of the machine 600 (e.g., processors 610), cause the machine 600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 650 include a wide variety of components to receive input, provide output, produce output, transmit information, exchange information, capture measurements, and so on. In general, it will be appreciated that the I/O components 650 can include many other components that are not shown in FIG. 6. The I/O components 650 are grouped according to functionality merely for simplifying the following discussion, and the grouping is in no way limiting. In various example system configurations, the I/O components 650 include output components 652 and input components 654. The output components 652 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 654 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example system configurations, the I/O components 650 include biometric components 656, motion components 658, environmental components 660, or position components 662, among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 662 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or another suitable device to interface with the network 680. In further examples, communication components 664 may include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 670 may be another machine 600 or any of a wide variety of peripheral devices (e.g., a peripheral device coupled via a Universal Serial Bus (USB)).

Moreover, in some system configurations, the communication components 664 detect identifiers or include components operable to detect identifiers. For example, the communication components 664 may include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417. Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 664, such as location via Internet Protocol (IP) geo-location, location via WI-FI® signal triangulation, location via detecting a BLUETOOTH® or NFC beacon signal that may indicate a particular location, and so forth.

In various example system configurations, one or more portions of the network 680 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, fifth generation wireless (5G) networks, Universal Mobile Telecommunications System (UMTS), High Speed Packet Access (HSPA), Worldwide Interoperability for Microwave Access (Wi-MAX), Long Term Evolution (LTE) standard, others defined by various standard-setting organizations, other long range protocols, or other data transfer technology.

In example system configurations, the instructions 616 are transmitted or received over the network 680 using a transmission medium via a network interface device (e.g., a network interface component included in the communication components 664) and utilizing any one of a number of well-known transfer protocols (e.g., Hypertext Transfer Protocol (HTTP)). Similarly, in other example system configurations, the instructions 616 are transmitted or received using a transmission medium via the coupling 672 (e.g., a peer-to-peer coupling) to the devices 670. The term "transmission medium" shall be taken to include any intangible medium that is capable of storing, encoding, or carrying the instructions 616 for execution by the machine 600, and includes digital or analog communications signals or other intangible media to facilitate communication of such software.

Furthermore, the machine-readable medium 638 is non-transitory (in other words, not having any transitory signals) in that it does not embody a propagating signal. However, labeling the machine-readable medium 638 "non-transitory" should not be construed to mean that the medium is incapable of movement; the medium 638 should be considered as being transportable from one physical location to another. Additionally, since the machine-readable medium 638 is tangible, the medium 638 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example system configurations, various modifications and changes may be made to these system configurations without departing from the broader scope of system configurations of the present disclosure.

The system configurations illustrated herein are described in sufficient detail to enable those skilled in the art to practice the teachings disclosed. Other system configurations may be used and derived therefrom, such that structural and logical substitutions and changes may be made without departing from the scope of this disclosure. The Detailed Description, therefore, is not to be taken in a limiting sense, and the scope of various system configurations is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various system configurations of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of system configurations of the present disclosure as represented by the appended claims. The specification and drawings are, accordingly, to be regarded in an illustrative rather than a restrictive sense.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A method comprising:
   associating, by a computing device, a recents tab with a portion of a memory of the computing device that is accessible by a messaging application, a music streaming application, and a music identification application on the computing device;
   storing, by the computing device, in the portion of the memory associated with the recents tab on the computing device, an audio history of received audio tracks including sounds or songs encountered by the messaging application, music streaming application, or music identification application;
   triggering, by the computing device, the recents tab to appear on a display of the computing device when at least one of the audio tracks in the audio history is triggered in the messaging application, music streaming application, or music identification application;
   determining, by the computing device, from which of the messaging application, music streaming application or music identification application each stored audio track in the audio history was encountered;
   storing, by the computing device, in the portion of the memory associated with the recents tab, a source identification of from which of the messaging application, music streaming application or music identification application each audio track was encountered;
   creating, by the computing device, a playlist of the audio tracks and source identification of the audio tracks including sounds or songs encountered by the messaging application, music streaming application, or music identification application and stored in the portion of the memory associated with the recents tab;
   displaying, by the computing device, the playlist of the audio tracks and source identification of the audio tracks associated with the recents tab on the display of the computing device for selection by a user; and
   playing, by the computing device, an audio track selected by the user from the playlist.

2. The method of claim 1, wherein when a song has been encountered in data received or generated by the messaging application or music streaming application, identifying the song using a music identification service.

3. The method of claim 1, wherein when a sound has been encountered in data received or generated by the messaging application or music streaming application, enabling the user of the computing device to provide a name or other identifying information for the sound.

4. The method of claim 1, wherein determining from which of the messaging application, music streaming application or music identification application each stored audio track was encountered comprises using at least one of a Global Positioning System of the computing device or a timestamp to identify at least one of where or when a particular audio track was received or generated by the messaging application, music streaming application or music identification application on the computing device.

5. The method of claim 1, further comprising ordering the audio tracks in the playlist associated with the recents tab in reverse chronological order where a most recently encountered audio track is at a top of the playlist.

6. The method of claim 1, further comprising providing on the display of the computing device an action menu with options for an audio track in the playlist.

7. The method of claim 6, further comprising displaying the action menu when the user presses and holds on a selection in the playlist to display on the display of the computing device options for the selection.

8. The method of claim 7, further comprising enabling selection of the options for the selection, the options including at least one of generating a report about a reaction by the user to the selection, viewing a sound page that enables the user to see other content that uses the audio track corresponding to the selection, or sending the selection to another user.

9. A computing device comprising:
a processor;
a display;
a memory;
a messaging application, a music streaming application, and a music identification application executed by the processor; and
a computer readable medium coupled with the processor, the computer readable medium comprising instructions stored thereon that are executable by the processor to cause the processor to perform operations comprising:
associating a recents tab with a portion of the memory of the computing device that is accessible by the messaging application, music streaming application, and music identification application;
storing, in the portion of the memory associated with the recents tab, an audio history of received audio tracks including sounds or songs encountered by the messaging application, music streaming application, or music identification application;
triggering the recents tab to appear on the display when at least one of the audio tracks in the audio history is triggered in the messaging application, music streaming application, or music identification application;
determining from which of the messaging application, music streaming application or music identification application each stored audio track in the audio history was encountered;
storing, in the portion of the memory associated with the recents tab, a source identification of from which of the messaging application, music streaming application, or music identification application each audio track was encountered;
creating a playlist of the audio tracks and source identification of the audio tracks including sounds or songs encountered by the messaging application, music streaming application, or music identification application and stored in the portion of the memory associated with the recents tab;
displaying the playlist of the audio tracks and source identification of the audio tracks associated with the recents tab on the display for selection by a user; and
playing an audio track selected by the user from the playlist.

10. The computing device of claim 9, further comprising instructions that when executed by the processor cause the processor to perform operations comprising identifying a song encountered in data received or generated by the messaging application or music streaming application using a music identification service.

11. The computing device of claim 9, further comprising instructions that when executed by the processor cause the processor to perform operations comprising enabling the user of the computing device to provide a name or other identifying information for the sound encountered in data received or generated by the messaging application or music streaming application.

12. The computing device of claim 9, further comprising at least one of a Global Positioning System or a timestamp that identifies at least one of where or when a particular audio track was received or generated by the messaging application, music streaming application, or music identification application.

13. The computing device of claim 9, further comprising instructions that when executed by the processor cause the processor to perform operations comprising ordering the audio tracks in the playlist associated with the recents tab in reverse chronological order where a most recently encountered audio track is at a top of the playlist.

14. The computing device of claim 9, further comprising instructions that when executed by the processor cause the processor to perform operations comprising providing on the display an action menu with options for an audio track in the playlist when the user presses and holds on a selection in the playlist.

15. The computing device of claim 14, further comprising instructions that when executed by the processor cause the processor to perform operations comprising enabling selection of the options for the selection, the options including at least one of generating a report about a reaction by the user to the selection, viewing a sound page that enables the user to see other content that uses the audio track corresponding to the selection, or sending the selection to another user.

16. A non-transitory computer readable medium comprising instructions stored thereon that are executable by at least one processor to cause a computing device to perform operations comprising:
associating a recents tab with a portion of a memory of the computing device that is accessible by a messaging application, a music streaming application, and a music identification application executed by the computing device;
storing in the portion of the memory associated with the recents tab on the computing device, an audio history of received audio tracks including sounds or songs encountered by the messaging application, music streaming application, or music identification application;
triggering the recents tab to appear on a display of the computing device when at least one of the audio tracks in the audio history is triggered in the messaging application, music streaming application, or music identification application;
determining from which of the messaging application, music streaming application or music identification application each stored audio track in the audio history was encountered;
storing, in the portion of the memory associated with the recents tab, a source identification of from which of the messaging application, music streaming application or music identification application each audio track was encountered;
creating a playlist of the audio tracks and source identification of the audio tracks including sounds or songs encountered by the messaging application, music streaming application, or music identification application and stored in the portion of the memory associated with the recents tab;

displaying the playlist of the audio tracks and source identification of the audio tracks associated with the recents tab on the display of the computing device for selection by a user; and playing an audio track selected by the user from the playlist.

\* \* \* \* \*